United States Patent
Viner et al.

[15] 3,660,881
[45] May 9, 1972

[54] METHOD OF MAKING A BEARING

[72] Inventors: Derek G. Viner; John S. Thompson, both of Ilford, England

[73] Assignee: The Plessey Company Limited, Ilford, England

[22] Filed: Sept. 15, 1970

[21] Appl. No.: 72,299

Related U.S. Application Data

[62] Division of Ser. No. 752,053, Aug. 12, 1968, Pat. No. 3,545,900.

[30] Foreign Application Priority Data

Sept. 2, 1967 Great Britain......................40,211/67

[52] U.S. Cl..............................29/149.5 NM, 29/149.5 PM
[51] Int. Cl. .....................................B21d 53/10, B23p 11/00
[58] Field of Search .........29/149.5 NM, 149.5 PM, 149.5 R, 29/148.4 A

[56] References Cited

UNITED STATES PATENTS 3,237,279  3/1966  Kohlhagen et al.............29/149.5 NM Primary Examiner—Thomas H. Eager
Attorney—Blum, Moscovitz, Friedman & Kaplan

[57] ABSTRACT

A carbon-lined journal bearing is manufactured by forcing a solid carbon plug into a socket bore of a metal body after introducing a quantity of adhesive into the closed end of the socket bore. The bore allows clearance round the plug so that the adhesive becomes extruded through the gap to fill the latter completely. After setting of the adhesive the two end surfaces are re-machined, the carbon plug is bored conversion into a carbon liner, the machining of the end face adjacent to the closed end of the socket bore being continued to remove the closed end portion of the latter.

2 Claims, 5 Drawing Figures

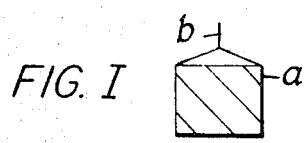
FIG. I
FIG. II
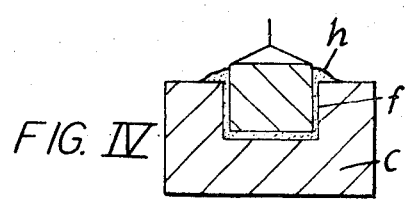
FIG. IV
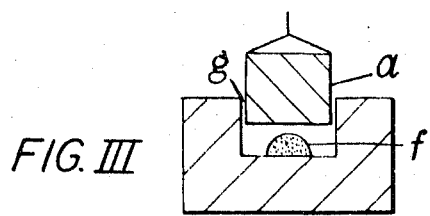
FIG. III
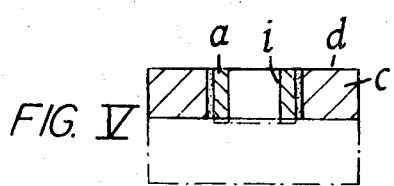
FIG. V

METHOD OF MAKING A BEARING

This application is a division of our co-pending application entitled Improvements in or Relating to Gear Pumps More Particularly for use with Hot Fluids, filed Aug. 12, 1968, Ser. No. 752,053, now U.S. Pat. No. 3,545,900, and claiming the priority of British Patent application No. 40211/67, filed Sept. 1967.

This invention relates to carbon-lined journal bearings and has for an object to provide an improved method of manufacturing such bearings which ensures intimate and permanent attachment of a liner made of carbon material. This carbon material may be a mixture of carbon with finely divided metal of a kind which, like carbon, has no degrading influence on hydro-carbon fluids at the desired temperature range above 150° C., such as antimony for example, or alternatively the material may be a mixture of carbon and copper, which has been found to be an acceptable composite material although copper or copper alloy alone is unacceptable.

The invention essentially consists of a method of providing a carbon-lined bearing which comprises providing a solid carbon blank having a diameter corresponding to the outside diameter of the desired lining, providing a metal bearing body having a flat-ended socket bore of diameter slightly greater than the outside diameter of said carbon blank, placing a suitable quantity of adhesive on the flat bottom of the bore, placing the carbon blank on top of this quantity of adhesive and applying an end-wise load on to this blank while heating the metal body to the curing temperature of the adhesive to allow the adhesive to form a continuous layer between the blank and the bore walls and the bottom of the bore and to cure the assembly in this condition, allowing the assembly to cool, and machining the composite body to provide the axial bore of the lining and to remove any material projecting beyond the desired end surface of the lined bearing. The bearing body may be made of steel or other material chosen mainly for its mechanical strength. One epoxy-base adhesive which has been found highly suitable for the purpose of the invention is the proprietary make known as Eccobond 104 marketed in Great Britain by Emerson & Cummings, which when it is cured at high temperatures chosen between 150° to 250° C. according to the components used, has a high strength at temperatures above 150° C.

Conveniently the carbon blank employed is arranged to have a wire passing through the center axis thereof, and this wire is utilised to position the carbon blank at the center of the bore.

In order that the invention may be more readily understood, one convenient method of producing a carbon lined bearing will now be described with reference to the accompanying drawing, in which successive stages of the operation are indicated by FIGS. I to V.

In FIG. I a carbon plug $a$ is produced having an outside diameter equal to the desired outside diameter of the lining, the plug preferably having embedded therein a guide wire indicated at $b$. In the following stage, as shown in FIG. II, a steel body $c$ is formed which may be described as a blank for the metal part of the bearing bush 13. It has a length somewhat greater than that of the carbon plug $a$ and has an upper plane surface $b$, from which a flat-bottomed socket bore $e$ penetrates to a depth somewhat less than the length of the carbon plug $a$ but still at least equal to the desired length of the bush to be formed. In FIG. III a blob $f$ of suitable adhesive, for example the material known as Eccobond 104, has been placed on the flat bottom $b$ of the socket bore $e$, and plug $a$ has been placed in coaxial relation within the bore $e$, leaving a narrow annular gap $g$ round the circumference of the plug $a$. In FIG. IV the plug, while still being maintained accurately centered relative to the bore $e$, has been forced down towards the body by a load applied to it in an axial direction at a temperature of the body $c$ of 70° C. As a result, the adhesive $f$ has been caused to spread over the bottom of the socket bore $e$ and to rise through the annular gap $g$, completely filling the latter, an excess of adhesive being spilled as indicated at $h$.

The adhesive is then cured at about 200° C., and after completion of the curing and subsequent cooling the assembly is machined as shown in FIG. V, first removing the portion of the plug and spilled adhesive above the surface $e$ and refinishing the surface $e$ to an accurate plane condition, whereafter a central bore $i$ is formed in the carbon plug $a$ to convert the latter into a liner inside the bore $e$, and finally the bottom portion of the blank $c$ is removed in order to reduce the latter to the desired length of the bush. This operation removes the unbored portion of the blank as well as the portion containing the bottom of the bore $e$ with the layer of adhesive spread along the bottom, and leaves a completed carbon-lined bush in which the bore $e$ forms a through bore.

It will be appreciated that axial compression of the plug $a$ will produce a certain degree of radial expansion in accordance with the precise plug material utilized. Since curing of the adhesive is effected with a compressive load applied bearings may be produced of prestressed carbon material which provide in use good load-bearing properties.

What we claim is:

1. A method of manufacturing a carbon-lined bearing which comprises the steps of providing a solid carbon blank having a diameter corresponding to the outside diameter of the bearing liner, and a metal bearing body having a socket bore of a diameter slightly greater than the outside diameter of the carbon blank; placing on the bottom of said bore a quantity of heat-curable adhesive, this quantity being greater than that required to make up the difference in the diameter of the blank and the bore; placing the carbon blank on top of this adhesive; applying to the blank and body an endwise load urging the blank towards the closed bottom of the socket bore, while heating the metal body to the curing temperature of the adhesive so as to cause the adhesive to form a continuous layer between the blank on the one hand and the walls and the bottom of the bore on the other hand, and to cure the adhesive with the said load still applied; allowing the adhesive to cool; and machining the composite body thus produced to provide an axial bearing bore and remove the material closing the end of the socket bore and other material projecting beyond the desired end surfaces of the bearing.

2. A method as claimed in claim 1 which includes the use of a carbon blank which has a wire passing through the center axis thereof, and the step of utilizing this wire to position the carbon blank in the center of the said bore.

* * * * *